(12) United States Patent
Tanaka et al.

(10) Patent No.: US 7,564,750 B2
(45) Date of Patent: Jul. 21, 2009

(54) REPRODUCING APPARATUS

(75) Inventors: Yasuyuki Tanaka, Suginami-ku (JP); Shinichi Yamashita, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 685 days.

(21) Appl. No.: 11/262,026

(22) Filed: Oct. 27, 2005

(65) Prior Publication Data

US 2006/0092790 A1     May 4, 2006

(30) Foreign Application Priority Data

Nov. 4, 2004    (JP) ............................. 2004-320635
Apr. 21, 2005   (JP) ............................. 2005-123521

(51) Int. Cl.
*G11B 7/005*    (2006.01)

(52) U.S. Cl. ................................. 369/47.28; 369/53.34

(58) Field of Classification Search ............... 369/47.1, 369/47.22, 53.34, 44.32, 44.35, 47.28, 59.12, 369/47.18, 47.48
See application file for complete search history.

(56) References Cited

U.S. PATENT DOCUMENTS

| 6,167,011  | A  | * | 12/2000 | Sun et al. ................. | 369/44.41 |
| 6,201,778  | B1 | * | 3/2001  | Sensyu ..................... | 369/53.34 |
| 6,236,629  | B1 | * | 5/2001  | Hisakado et al. ......... | 369/47.32 |
| 6,434,091  | B1 | * | 8/2002  | Kuribayashi ............. | 369/44.13 |
| 7,016,284  | B2 | * | 3/2006  | Chou ....................... | 369/53.34 |
| 7,173,890  | B2 | * | 2/2007  | Arai ........................ | 369/47.22 |
| 2002/0110059 | A1 | * | 8/2002 | Usui et al. ............... | 369/47.28 |
| 2003/0185115 | A1 | * | 10/2003 | Yamamoto et al. ........ | 369/47.3 |
| 2004/0207475 | A1 | * | 10/2004 | Minamino et al. ........... | 331/16 |
| 2005/0068866 | A1 | * | 3/2005 | Serrano et al. ........... | 369/47.28 |
| 2005/0088935 | A1 | * | 4/2005 | Nakata et al. ............ | 369/47.27 |

FOREIGN PATENT DOCUMENTS

JP          2004-005926 A         1/2004

* cited by examiner

*Primary Examiner*—Wayne R Young
*Assistant Examiner*—Thomas D Alunkal
(74) *Attorney, Agent, or Firm*—Canon U.S.A., Inc. I.P. Division (57) ABSTRACT

A reproducing apparatus includes a reading unit configured to generate a reproduced signal containing information data recorded in a track using a reflected light of an optical beam, a clock generation unit configured to generate a clock having a frequency associated with a wobbling cycle of the track, and a control unit configured to detect a phase difference between the reproduced signal and the clock, and to control the clock generation unit using the phase difference detection result.

15 Claims, 6 Drawing Sheets

REPRODUCING APPARATUS

BACKGROUND OF THE INVENTION

1. Field of the Invention

The present invention relates to a reproducing apparatus, and more particularly, though not exclusively, to an apparatus for reproducing data from a disk recording medium.

2. Description of the Related Art

A high-density optical disks (e.g., a digital versatile disk (DVD) or a blu-ray disk) have been developed conventionally.

In a disk of this type, a groove is spirally formed thereon, and an optical beam is applied using this groove as a recording/reproducing track to write/read information. To superimpose addresses on the disk or to obtain a clock during reproduction, the groove is formed beforehand wobbling in a fixed cycle on the disk. When performing reproduction, an optical beam is applied to this wobbling track. From its reflected light, a clock associated with the wobbling cycle is generated, and address information is read. A clock, synchronized in phase with information contained in the reflected light, is generated to detect the information data (e.g., refer to Japanese Patent Application Laid-Open No. 2004-5926).

However, in the case of the apparatus discussed in Japanese Patent Application Laid-Open No. 2004-5926, the apparatus is equipped with two PLL circuits for generating the clock of the wobbling cycle where the clock is synchronized with the reproduced data. Thus, problems of increases in circuit size and costs have inevitably occurred.

Furthermore, unevenness in temperature characteristics, or processes between the two PLL circuits can cause a change in clock frequency, creating a problem in reliably obtaining a stable clock.

SUMMARY OF THE INVENTION

At least one exemplary embodiment is directed to an apparatus configured to obtain a stable clock without enlarging a circuit.

At least one exemplary embodiment is directed to an apparatus configured to more accurately detect address information.

At least one exemplary embodiment is directed to a method that facilitates the stable rotation of a disk.

At least one exemplary embodiment is directed to a reproducing apparatus which includes a reading unit configured to apply an optical beam to a track formed on a disk recording medium that wobbles at a fixed cycle and to generate a wobbling signal containing a frequency component associated with the wobbling cycle of the track. Additionally the reading unit can be configured to generate a reproduced signal containing information data recorded in the track using reflected light from the optical beam. There producing unit can further include a clock generation unit configured to generate a clock having a frequency associated with the wobbling cycle using the wobbling signal, and a control unit configured to detect a phase difference between the reproduced signal and the clock and to control a generation operation of the clock generation unit using the phase difference detection result.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments.

DETAILED DESCRIPTION OF THE EMBODIMENTS

The following description of exemplary embodiment(s) is/are merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example certain circuitry for a phase comparator, loop filter, frequency divider, phase detector and others may not be discussed in detail. However these systems and the methods to fabricate these system as known by one of ordinary skill in the relevant art is intended to be part of the enabling disclosure herein where appropriate.

Note that similar reference numerals and letters refer to similar items in the following figures, and thus once an item is defined in one figure, it may not be discussed for following figures.

Exemplary embodiments will be described in detail below with reference to the drawings.

Figure 6:
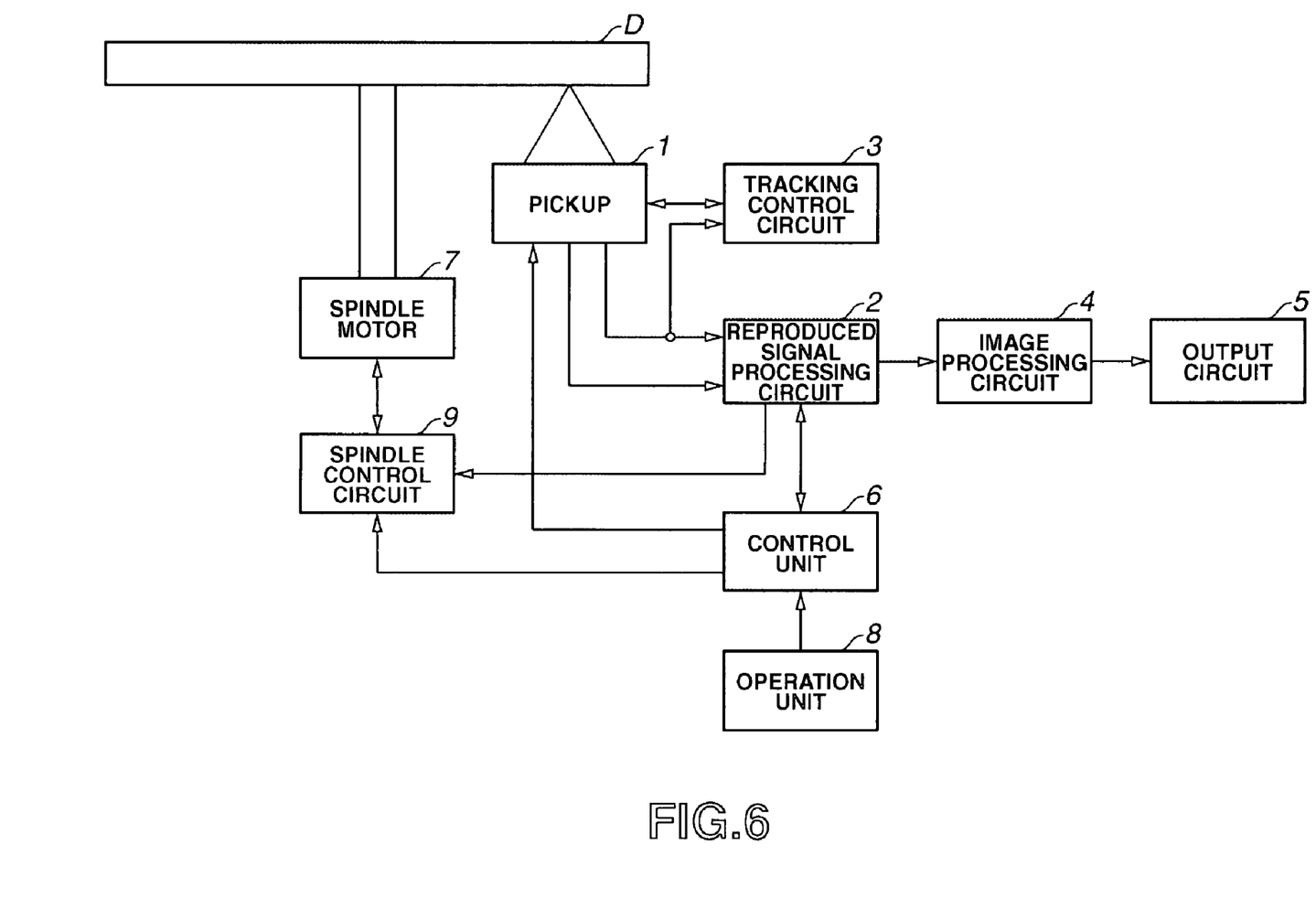
FIG. 6 illustrates a diagram showing a configuration of a reproducing apparatus in accordance with at least one exemplary embodiment.

FIG. 6 illustrates a block diagram showing a configuration of a reproducing apparatus in accordance to at least one exemplary embodiment.

The reproducing apparatus of FIG. 6 is configured to read information, (e.g., image data), from an optical disk (e.g., a blu-ray disk).

Referring to FIG. 6, a pickup 1 applies an optical beam to an optical disk D, reads its reflected light, and generates a wobbling signal containing a frequency component of a track wobbling cycle and a reproduced RF signal containing information in its high-frequency band. According to the exemplary embodiment, the information data is recorded in a groove formed beforehand on the disk D. The groove wobbles at a fixed cycle. Address information is detected using this wobbling.

The wobbling signal from the pickup 1 is supplied to a tracking control circuit 3. Based on a low-frequency component of the wobbling signal, the tracking control circuit 3 controls tracking of the pickup 1. A clock synchronized in phase with reproduced data is generated by a reproduction signal processing circuit 2 using these wobbling and reproduced RF signals, and original digital data is detected based on the reproduced RF signal so as to be output to an image processing circuit 4. The image processing circuit 4 subjects the reproduced digital image data to error reduction processing, and/or MPEG decoding processing, for outputting the processed data to an output circuit 5. The output circuit 5 outputs the reproduced image data to an external device.

A control unit 6 controls a spindle control circuit 9 according to an instruction from an operation unit 8 to perform reproduction. The control unit 6 causes a spindle motor 7 to rotate the disk D at a predetermined speed, and instructs the pickup 1 to read the data. The control unit 6 moves the pickup 1 to a desired sector on the Disk D based on address information output from the reproduced signal processing circuit 2. Additionally, the control unit 6 outputs a speed error signal obtained by the reproduced signal processing circuit 2, as described later, to the spindle control circuit 9 to control a rotational speed of the spindle motor 7.

Next, the reproduced signal processing circuit 2 in accordance with at least one exemplary embodiment is described.

Figure 1:
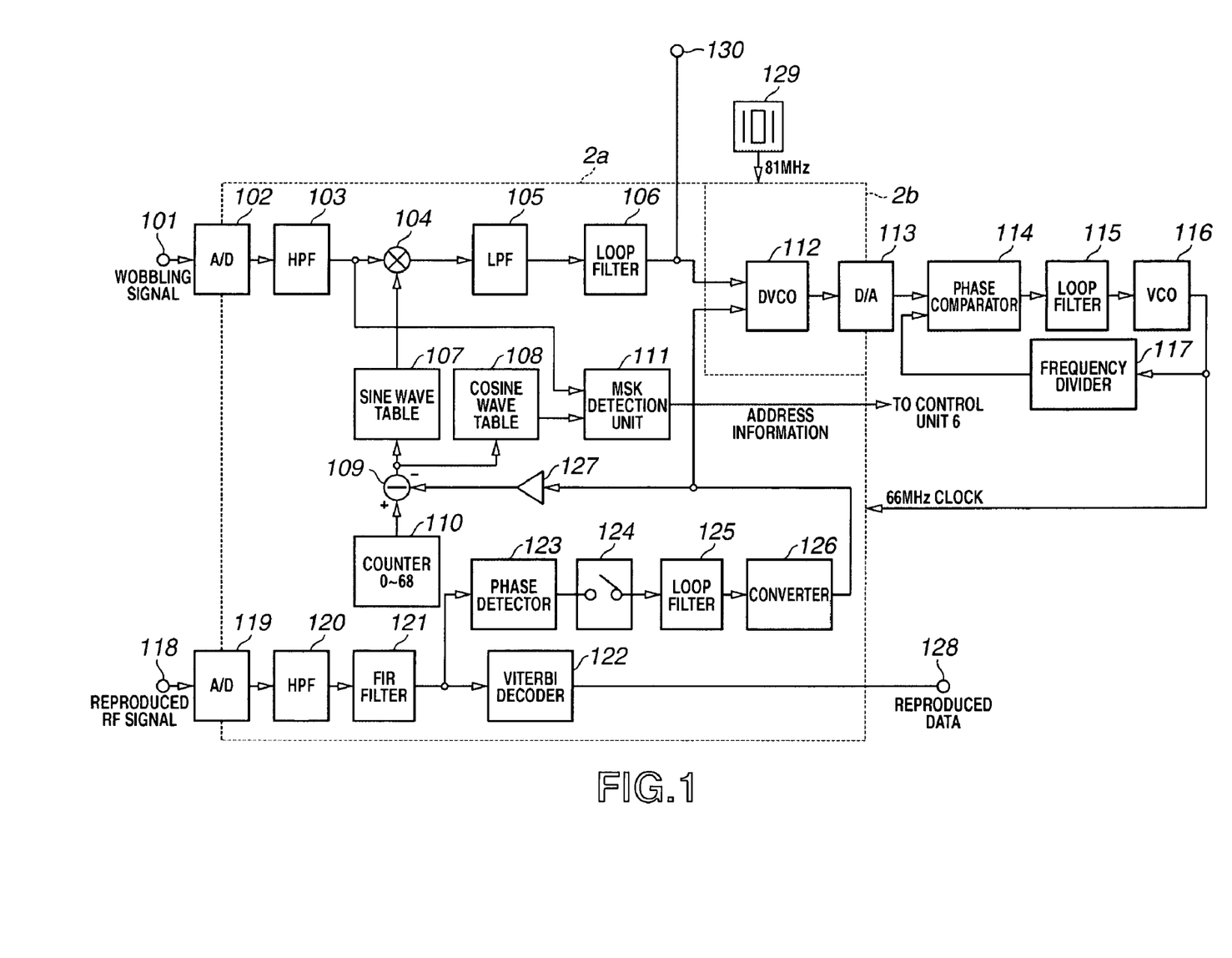
FIG. 1 illustrates a diagram showing a configuration of a reproduction signal processing circuit according to an exemplary embodiment.

FIG. 1 is a diagram showing a configuration of the reproduced signal processing circuit 2 in accordance with at least one exemplary embodiment.

Referring to FIG. 1, a wobbling signal for controlling tracking is output from the pickup 1, and supplied to a terminal 101. According to the exemplary embodiment, as described above, an address or clock information is superimposed by wobbling the track on the disk D. A clock component is extracted from this wobbling signal, and its frequency is multiplied, thereby generating a clock according to a recording frequency of data.

For example, according to at least one exemplary embodiment using a blu-ray disk for the disk D, its data recording frequency fb is set to 66 MHz. A frequency fw of the clock component superimposed on the wobbling signal is set to 956 kHz that is obtained by dividing 66 MHz by 69.

The wobbling signal input to the terminal 101 is sampled by an A/D converter 102 according to a clock (e.g., of roughly 66 MHz) generated by a VCO 116 (described later), and converted into digital data of plural bits in one sample to be output to a high pass filter 103 (HPF). Note that the non-limiting example illustrated in FIG. 1 uses a clock frequency generated by the VCO 116 of 66 MHz, however exemplary embodiments can use a variety of clock frequencies and are not limited to 66 MHz. The high pass filter 103 integrates the digital data received from the A/D converter 102 to calculate an average value, and subtracts the average value from the input to reduce a DC component (i.e., a bias), and adds its result to one terminal of a multiplier 104.

A counter 110, in this non-limiting example configured for a 66 MHz clock, repeatedly counts the 66 MHz clock from 0 to 68, and adds its counted value to one input of a subtracter 109. A signal indicating a phase shifting amount (described later) is input to another terminal of the subtracter 109. The subtracter 109 subtracts this phase shifting amount from the output of the counter 110 to output its result to a sine wave table 107 and a cosine wave table 108.

The sine wave table 107 generates a sine wave having a cycle of roughly 1/956 kHz obtained by dividing the clock of 66 MHz by a counted value 69 of the counter 110, and adds it as another input to the multiplier 104. In other words, each output value of the subtracter 109 corresponds to each phase when one cycle 0° to 360° of a sine wave is divided by 69, and a signal is output from the sine wave table 107 according to the output value of the subtracter 109.

A multiplication result of the multiplier 104 is output to a moving average filter (low pass filter, LPF) 105. The moving average filter 105 obtains an average of one wobbling cycle of the output of the multiplier 104, and outputs its result to a loop filter 106. A value output from the moving average filter 105 indicates a phase difference between the wobbling signal added to the terminal 101 and the sine wave generated by the sine wave table 107. The loop filter 106 subjects the added phase difference signal to lag-lead integration to convert it into a frequency difference with a reference frequency (sine wave generated by the sine wave table 107), adds the frequency difference to a frequency input terminal of a digital VCO 112 (DVCO), and outputs it as a line velocity error signal to a terminal 130.

A circuit block 2b that includes the digital VCO 112 and a subsequent D/A converter 113 is operated by a clock of a second clock frequency (e.g., in the non-limiting example shown, 81 MHz) supplied from a crystal oscillator 129. The digital VCO 112 will be described later. An output of the digital VCO 112 is converted into an analog voltage by the D/A converter 113 to be output to a phase comparator 114.

The phase comparator 114, a loop filter 115, a voltage control oscillator 116 (VCO), and a frequency divider 117 constitute a clock multiplication PLL. This PLL multiplies, (e.g., a sine wave of 4.125 MHz by 16), which is output from the D/A converter 113 to generate a clock of roughly 66 MHz This clock of 66 MHz is supplied to a circuit block 2a surrounded by a broken line in FIG. 1.

According to the exemplary embodiment, a division ratio of the frequency divider 117 is set to 1/16, which can be set to other values. However, multiplication processing can become more difficult when a division ratio is larger. On the other hand, an oscillation frequency can be increased when the division ratio is small, and therefore for the non-limiting example it is set to 1 1/16 in the present example of the exemplary embodiment. The oscillation frequency of the crystal oscillator 129 is set to 81 MHz. However, it can be set to other frequencies.

The cosine wave table 108 generates a cosine wave phase-shifted by 90° from the sine wave generated by the sine wave table 107, and sends it to a MSK detection unit 111. The MSK detection unit 111 detects the address information superimposed on the wobbling signal of the disk from the cosine wave supplied from the cosine wave table 108 and the wobbling signal supplied from the high pass filter 103, and outputs it to the control unit 6 (FIG. 6).

Figure 4:
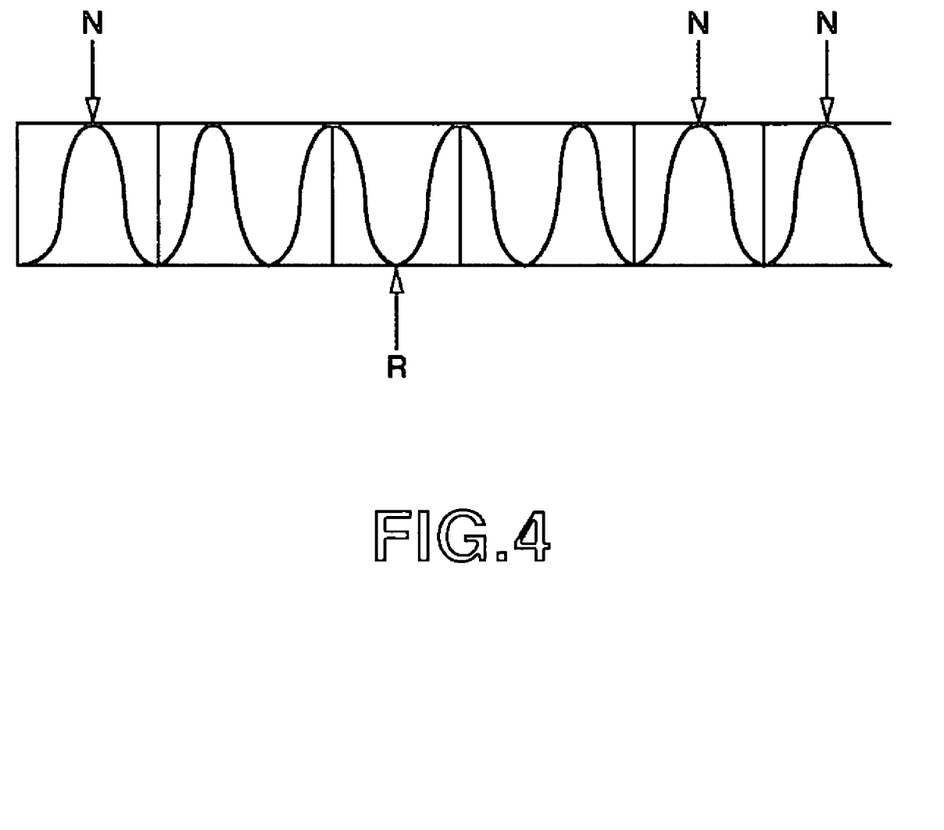
FIG. 4 illustrates a diagram showing an address detection operation by a MSK detection unit.

A MSK signal superimposed on the wobbling signal is described by referring to FIG. 4.

A waveform of a sine wave is an example of a wobbling signal, a portion N is a normal wobbling signal, and R is a portion on which a phase is inverted and address information is superimposed. A cosine wave signal synchronized in phase with the normal wobbling signal is supplied to the MSK detection unit 111, and two supplied signals are multiplied to detect the address information.

On the other hand, the reproduced RF signal output from the pickup 1 is supplied to a terminal 118. The reproduced RF signal added to the terminal 118 is sampled according to the clock of 66 MHz of the A/D converter 119, and output as digital data of plural bits in one sample to a high pass filter 120. The high pass filter 120 integrates the added digital data to calculate an average value, subtracts the average value from the input to reduce a DC component, and sends its result to a FIR filter 121. The FIR filter 121 is for example, a FIR filter of 5 taps. The FIR filter 121 subjects the reproduced RF signal which was input thereto to high-frequency emphasis processing, and sends its result to a Viterbi decoder 122 and a phase detector 123. The Viterbi decoder 122 executes Viterbi decoding process using a correlation in a time direction contained in a multivalued signal which was input thereto so as to detect digital data of 1 bit in one sample having few errors. Then, the Viterbi decoder 122 outputs the digital data to the image processing circuit 4 via a terminal 128.

The phase detector 123 detects a zero cross point in an eye pattern of the multivalued reproduced signal it received, and detects a phase difference between the clock and the reproduced signal from its inclination. Then, the phase detector 123 sends a result of the phase difference detection to a switch 124. The switch 124 is controlled by the control unit 6, and can be closed when a phase difference can be detected from the reproduced RF signal so as to send a result of the phase difference detection to a loop filter 125. When phase detection is impossible, 0 is given to the loop filter 125. The loop filter 125 subjects the phase difference signal it received to lag-lead integration to convert it into a frequency difference, and sends its result to a converter 126.

The converter 126 adds a numerical value to the frequency difference it received without making a carry so as to convert the frequency difference into a phase difference. Then, the converter 126 sends its result to a phase input terminal of the digital VCO 112 and a multiplier 127.

Figure 2A:
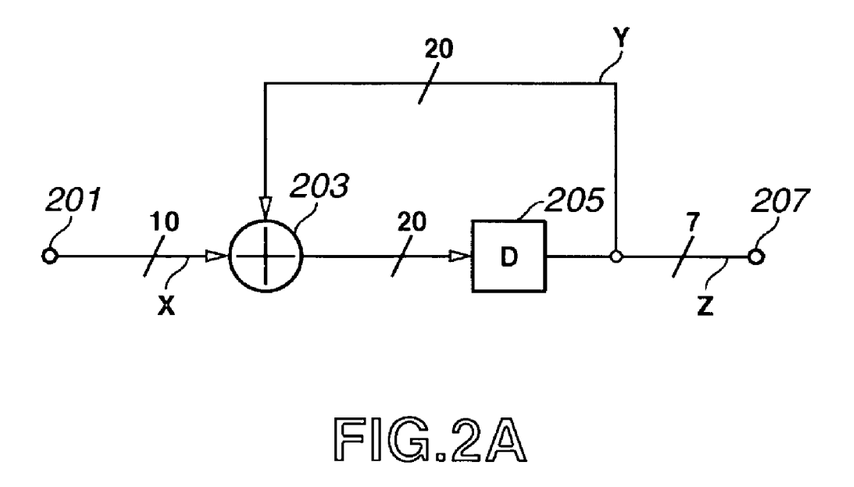
FIGS. 2A and 2B illustrate diagrams showing a configuration and an operation of a converter.
Figure 2B:
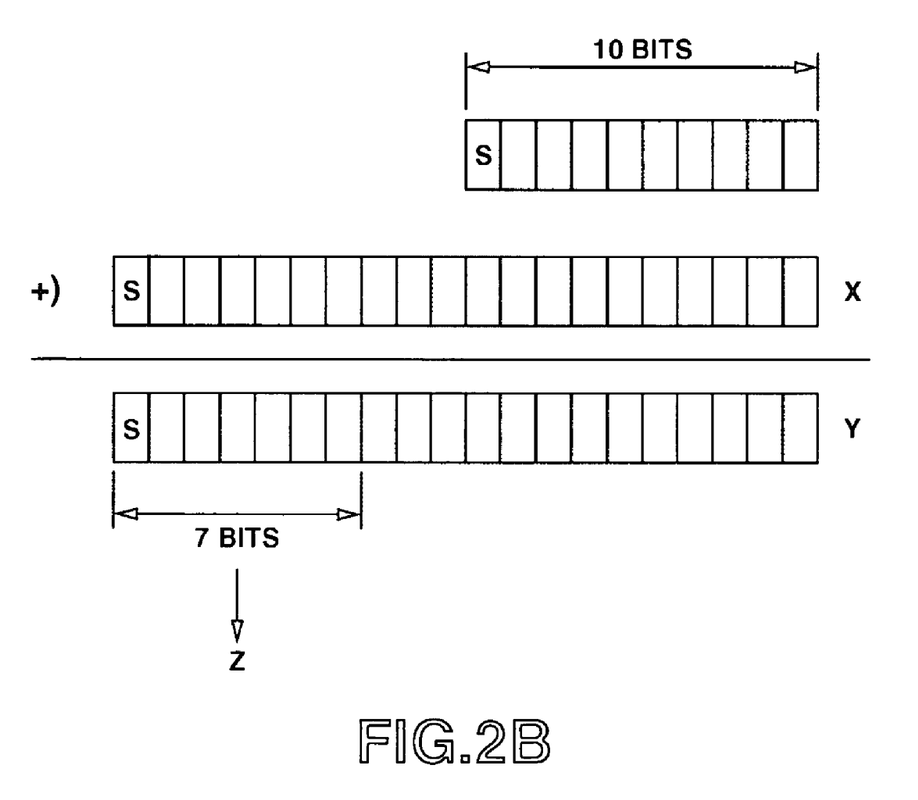

Processing within the converter 126 is described by referring to FIGS. 2A and 2B. FIG. 2A illustrates a diagram showing a configuration of the converter 126. A frequency difference signal is added as 10-bit digital data, having a sign from the loop filter 125, to a terminal 201. This is expanded to 20-bit data and sent to an adder 203. A 20-bit value held in a register 205 is sent to one input of the adder 203, and an addition result is sent again to the register 205. These devices constitute an integrator. Upper 7 bits of the register 204 are output to an output terminal 207 as a value indicating a phase.

FIG. 2B illustrates a state of allocated bits. X, Y and Z correspond to signals in FIG. 2A.

An addition result obtained by the adder 203 can overflow. However, the overflowing is ignored without making a carry. For example, suppose that an input is 1 and a clock is 66 MHz, $66e6 \times 1 \div (2^{20}) = 62.9$ Hz is established, a phase difference output is obtained in which $1/62.9 = 15.9$ milliseconds is set as one cycle.

In this case, an output cycle of the phase difference signal becomes shorter when a bit number of the register 205 is reduced, and becomes longer when a bit number is increased. In other words, a gain of phase difference adjustment varies at the digital VCO 112, which is described later.

Figure 3A:
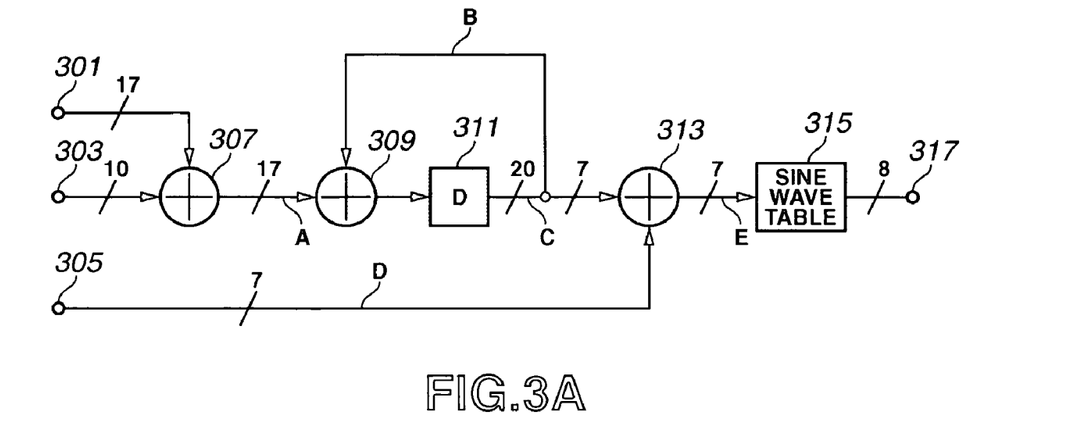
FIGS. 3A and 3B illustrate diagrams showing a configuration and an operation of a digital VCO.
Figure 3B:
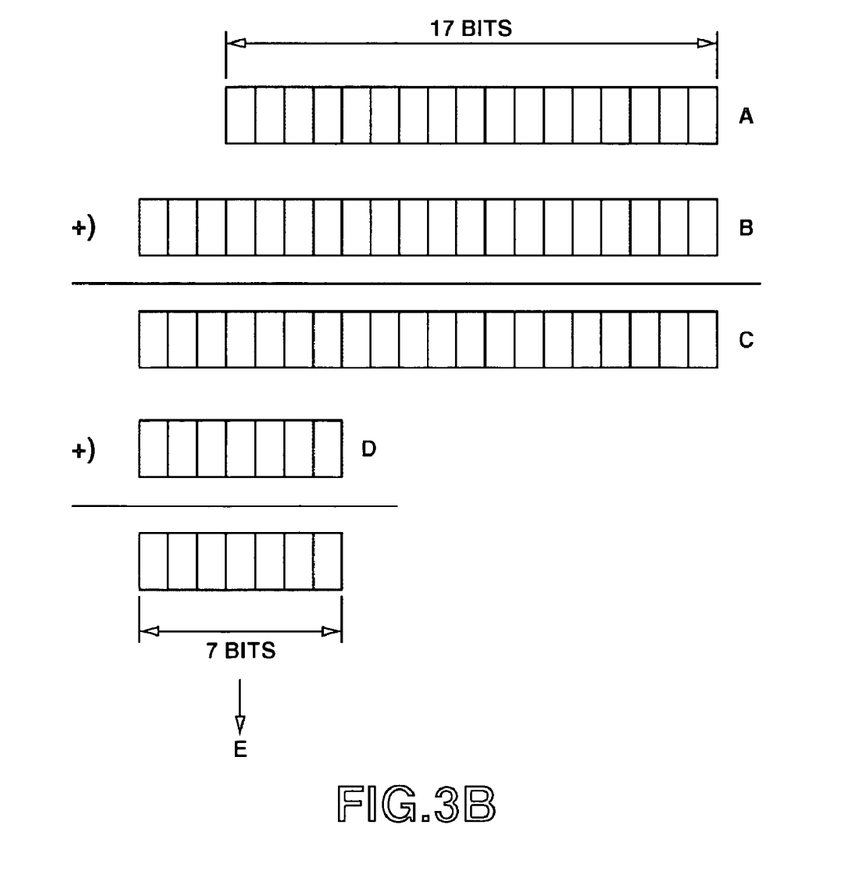

An operation of the digital VCO 112 is described by referring to FIGS. 3A and 3B.

FIG. 3A illustrates a diagram showing a specific configuration of the digital VCO 112.

Referring to FIG. 3A, a set value which is set by the control unit 6 corresponding to a target frequency of a clock is supplied to a terminal 301. For example, since a target clock frequency is 66 MHz, when n that satisfies the following equation is calculated:

$$n \times 81 \text{ MHz} \div 2^{20} \times 16 \text{ multiplication} = 66000000 \text{ Hz}$$

n is about 53400. In this case, for example, 53400 is set. A frequency difference signal is added from the loop filter 106 to a terminal 303. A value of a center frequency received from the terminal 301 and a frequency difference value received from the terminal 303 are added together by an adder 307. An addition result of the adder 307 is further sent to an adder 309.

An integrator can be configured such that a 20-bit value held in a register 311 is sent to one terminal of the adder 309, and the addition result is sent again to the register 311. The addition result of the register 311 can overflow in some cases, but the overflow is ignored without making a carry in this case. The upper 7 bits of the register 311 are sent to an adder 313. A phase difference value from the converter 126 is sent to another input of the adder 313 via a terminal 305. An addition result of the adder 313 may not be indicated within 7 bits in some cases, but the overflow is ignored.

The addition result of the adder 313 is sent to a sine wave table 315. The sine wave table 315 has the same function as the sine wave table 107. Its input represents, for example, a phase of 0° to 360° with a 7-bit value of 0 to 127, and an output value 1 of the adder 313 represents $360° \div 128 = 2.8°$. The sine wave table 315 outputs a value of an 8-bit sine wave to a terminal 317 according to an input phase. FIG. 3B shows a state of allocated bits.

A to E of FIG. 3B correspond to signals in FIG. 3A. For example, when a frequency difference given to the terminal 303 is 0, and a center frequency given to the terminal 301 is 53400, A in FIG. 3B is 53400. Since the register 311 includes 20 bits, and the clock is 81 MHz, the register 311 overflows at a cycle of $81e6 \times 53400 \div (2^{20}) = 4125023$ MHz. As a result, a phase of a sine wave signal output from the sine wave table 315 return to 0°.

The upper 7 bits of a value of the register 311 are taken out, and a phase difference value given from the terminal 305 is added in the adder 313 to shift a phase value. Then, the results are output to the sine wave table 315 to generate a sine wave, converted into an analog signal by the D/A converter 113, and multiplied by 16 at the PLL, thereby generating a clock of $4125023 \text{ Hz} \times 16 = 66000368$ Hz. This clock is used as a clock for recording/reproducing, and also as a clock for the digital circuit block 2a of FIG. 1.

According to the exemplary embodiment, the register 311 is set to 20 bits. This is for the purpose of generating a signal of several MHz, 4.125 MHz in this case, as an output of the digital VCO 112 which is supplied to the phase comparator 114. When a signal of a higher frequency or a lower frequency is supplied to the phase comparator 114, a bit number of the register 311 can be properly changed accordingly.

As A in FIG. 3B becomes 53401 when 1 is given to the terminal 303, a clock frequency becomes $81e6 \times 53401 \div (2^{20}) \times 16 = 66001602$ Hz. Each time the input changes by 1, the clock frequency changes by $66001602 - 66000368 = 1234$ Hz.

As described above, the phase difference converted by the converter 126 is sent to one input of the subtracter 109 after the phase of the digital VCO 112 is shifted and the gain is adjusted by the multiplier 127. Accordingly, the phase values supplied from the counter 110 to the sine wave table 107 and the cosine wave table 108 are shifted. The gain of the multiplier 127 can be set such that the phase shifting amount of the digital VCO 112 and the phase shifting amount supplied from the multiplier 127 to the subtracter 109 cancel each other. With this configuration, it is possible to generate a clock synchronized in phase with the reproduced RF signal during reproduction while aligning the center frequency of the digital VCO with the wobbling signal.

Figure 5:
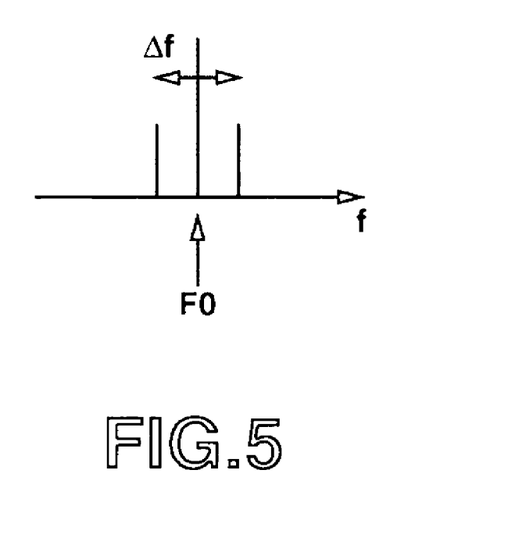
FIG. 5 illustrates a diagram showing a state of a clock frequency control.

This state is schematically described by referring to FIG. 5. In FIG. 5, a center frequency F0 is set by a frequency which is a 69 multiple of a wobbling signal, and the frequency is fine-adjusted by Δf based on phase shift information from a RF signal, so that a phase of a clock can be synchronized with a reproduced signal.

When an output phase of the digital VCO 112 is shifted based on the phase shift information from the RF signal, it is applied as an external disturbance on a phase detection loop via the wobbling signal constituted by the counter 110, the sine wave table 107, and the multiplier 104 so as to reduce it.

Thus, according to the exemplary embodiment, the counted value of the counter 110 is shifted based on the phase difference of the reproduced RF signal, and the phase of the sine wave for detecting the wobbling signal is simultaneously moved. Accordingly, the phases cancel each other and are prevented from working as external disturbances, so that the clocks can be stably generated.

Simultaneously, the cosine wave phase supplied to the MSK detection unit 111 for detecting an address is similarly shifted to reduce detection problems. Moreover, the spindle motor is controlled to set a desired frequency and phase of the wobbling signal, so that clocks can be generated more stably.

Figure 7:
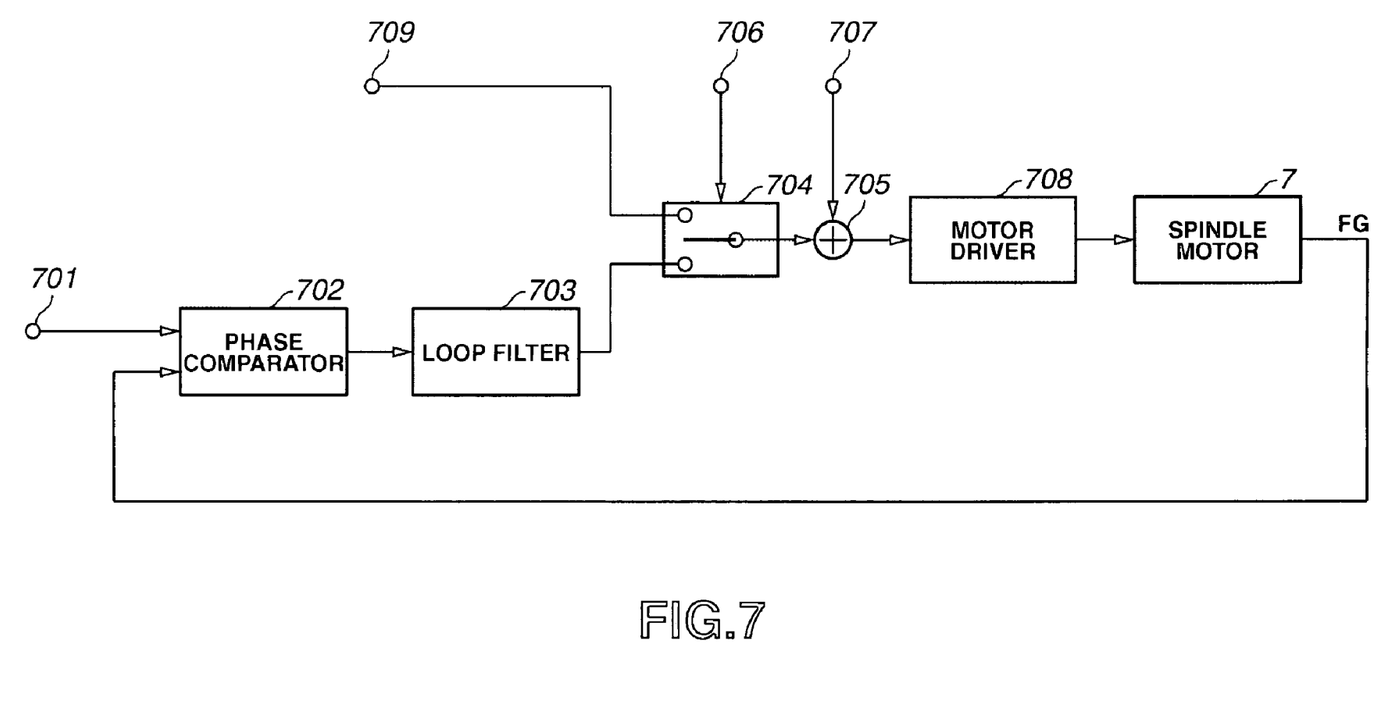
FIG. 7 illustrates a diagram showing a configuration of a spindle control circuit.

Next, control of the spindle motor is described by referring to FIG. 7.

FIG. 7 illustrates a diagram showing a main portion of the spindle control circuit 9 of FIG. 6.

Referring to FIG. 7, frequency information that is a rotation reference for the spindle motor 7 is supplied to a terminal 701 by the control unit 6, and is output to one input of a phase comparator 702. On the other hand, from the spindle motor 7, a FG pulse proportional to a rotational speed of the spindle motor 7 is output, and supplied to another input of the phase comparator 702.

The phase comparator 702 compares the reference frequency information received from the terminal 701 with a phase of the FG signal received from the spindle motor 7, and outputs a result of the comparison to a loop filter 703. The loop filter 703 averages outputs of the phase comparator 702, and outputs its result to one terminal of a switch 704. An output result of the loop filter 703 is an error with respect to a reference rotational speed of the spindle motor 7.

The output of the loop filter 703 is supplied to an adder 705 via the switch 704. The adder 705 adds together a center value of control supplied from the control unit 6 to a terminal 707 and an error signal supplied from the switch 704, and outputs its result to a motor driver 708. The motor driver 708 controls a rotational speed of the spindle motor 7 according to an output of the adder 705, and rotates the disk D at a frequency compliant with the reference frequency added to the terminal 701.

The switch 704 is switched according to a switching control signal supplied from the control unit 6 to the terminal 706. Namely, when the pickup is not lit or tracking servo/focusing servo is not applied, (e.g., at the time of starting the spindle motor 7), the switch 704 is switched to the loop filter 703 side. When tracking servo/focusing servo is applied and a wobbling signal is generated, the switch 704 is switched to a terminal 709 side.

An output of the loop filter 106 of FIG. 1 is added to the terminal 709. The output of the loop filter 106 represents a frequency difference between the detected wobbling signal and the reference frequency signal output from the sine wave table 107. This is a line velocity error of the disk D. The rotational speed of the disk D driven by the spindle motor 7 is controlled to reduce this error, so that the disk D can be rotated at a constant velocity corresponding to a target frequency. Control of the spindle motor is often carried out by a microcomputer control or software control using a servo DSP. However, basic processing is similar.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application Nos. 2004-320635 and 2005-123521 filed Nov. 4, 2004, and Apr. 21, 2005 respectively, which are hereby incorporated by reference herein in their entirety.

What is claimed is:

1. A reproducing apparatus comprising:
a reading unit configured to apply an optical beam to a track which is formed on a disk recording medium and wobbles at a predetermined cycle and to generate a wobbling signal containing a frequency component associated with the wobbling cycle of the track and a reproduced signal containing information data recorded on the track;
a clock generation unit configured to generate a clock having a frequency associated with the wobbling cycle using the wobbling signal, the clock generation unit including a reference signal generation unit configured to generate a reference cycle signal of the frequency associated with the wobbling cycle, a detection unit configured to detect a frequency difference between the reference cycle signal and the wobbling signal, a sine wave signal generation unit configured to generate a sine wave signal based on an output of the detection unit, and a multiplication unit configured to multiply a frequency of the sine wave signal to generate the clock; and
a control unit configured to detect a phase difference between the reproduced signal and the clock, and to control a generation operation of the clock generation unit using the phase difference, the control unit changing a phase of the reference cycle signal and a phase of the sine wave signal based on the phase difference.

2. The reproducing apparatus according to claim 1, wherein the multiplication unit includes a PLL circuit constituted by a phase comparator, a loop filter configured to receive an output of the phase comparator, an oscillator configured to output a signal of a frequency according to an output of the loop filter as the clock, and a frequency divider to divide the clock coming from the oscillator, and the sine wave signal output from the sine wave signal generation unit and an output signal of the frequency divider are input to the phase comparator.

3. The reproducing apparatus according to claim 1, wherein the detection unit includes a phase difference detection unit configured to detect a phase difference between the reference cycle signal and the wobbling signal, and a conversion unit configured to convert an output of the phase difference detection unit into a frequency difference at the wobbling cycle, the sine wave signal generation unit includes an addition unit configured to add together a set value associated with a target frequency of the sine wave signal and an output value of the conversion unit, an integration unit configured to integrate an output value of the addition unit at a predetermined cycle, and a table unit configured to receive an integrated value of the integration unit as a phase to generate the sine wave signal, and the control unit changes the integrated value supplied to the table unit based on the phase difference to change the phase of the sine wave signal.

4. The reproducing apparatus according to claim 3, further comprising a crystal oscillator configured to generate an operation clock of the predetermined cycle,
wherein the integration unit carries out the integration operation according to the operation clock output from the crystal oscillator.

5. The reproducing apparatus according to claim 1, wherein the reference signal generation unit includes a counter configured to count the clock, and a table unit configured to receive a counted value of the counter as a phase of the reference cycle signal to generate the reference cycle signal, and the control unit changes the counted value of the counter supplied to the table unit to change the phase of the reference cycle signal according to the phase difference detection result.

6. A reproducing apparatus comprising:
a reading unit configured to apply an optical beam to a track which is formed on a disk recording medium and wobbles at a predetermined cycle and to generate a wobbling signal containing a frequency component associated with the wobbling cycle of the track and a reproduced signal containing information data recorded on the track;
a clock generation unit configured to generate a clock having a frequency associated with the wobbling cycle using the wobbling signal, the clock generation unit including a sine wave signal generation unit configured to generate a sine wave signal based on a frequency difference between a reference cycle signal synchronized with the clock and the wobbling signal, and a multiplication unit configured to multiply a frequency of the sine wave signal to generate the clock; and
a control unit configured to detect a phase difference between the reproduced signal and the clock and to change a phase of the sine wave signal based on the phase difference.

7. The reproducing apparatus according to claim 6, wherein the control unit is operated according to the clock.

8. The reproducing apparatus according to claim 7, wherein the control unit includes an A/D converter configured to sample the reproduced signal according to the clock to covert the data into digital data, and a phase difference detector configured to convert the digital data output from the A/D converter into multivalued data and to detect a phase difference between the clock and the reproduced signal based on inclination of a zero cross point in the multivalued data.

9. The reproducing apparatus according to claim 6, further comprising an address detection unit configured to detect address information on the recording medium based on the wobbling signal,
wherein the control unit further controls a detection operation of the address detection unit according to the phase difference detection result.

10. The reproducing apparatus according to claim 9, further comprising:
a reference signal generation unit configured to generate the reference cycle signal, wherein the address detection unit detects the address information using the reference cycle signal, and the control unit changes a phase of the reference cycle signal based on the phase difference.

11. The reproducing apparatus according to claim 6, wherein the clock generation unit includes a frequency difference detection unit configured to detect a frequency difference between and the reference cycle signal and the wobbling signal, and the sine wave signal generation unit generates sine wave signal based on an output of the frequency difference detection unit.

12. The reproducing apparatus according to claim 11, further comprising a rotation control unit configured to control rotation of the disk recording medium using the output of the frequency difference detection unit.

13. The reproducing apparatus according to claim 12, wherein the rotation control unit includes a comparison unit configured to compare a rotational speed of the disk recording medium with a target rotational speed to detect a difference therebetween, a selection unit configured to select and output either one of the output of the frequency difference detection unit or an output of the comparison unit, and a driving unit configured to rotary-drive the disk recording medium using an output of the selection unit.

14. The reproducing apparatus according to claim 13, wherein the selection unit selects either one of the output of the frequency difference detection unit or the output of the comparison unit according to a reading result of the wobbling signal by the reading unit.

15. A signal processing apparatus comprising:
an input unit configured to input a wobbling signal and a reproduced signal obtained by applying an optical beam to a track which is formed on a disk recording medium and wobbles at a predetermined cycle, the wobbling signal containing a frequency component associated with the wobbling cycle of the track and the reproduced signal containing information data recorded in the track;
a clock generation unit configured to generate a clock having a frequency associated with the wobbling cycle using the wobbling signal, the clock generation unit including a sine wave signal generation unit configured to generate a sine wave signal based on a frequency difference between a reference cycle signal synchronized with the clock and the wobbling signal, and a multiplication unit configured to multiply a frequency of the sine wave signal to generate the clock; and
a control unit configured to detect a phase difference between the reproduced signal and the clock and to change a phase of the sine wave signal based on the phase difference.

* * * * *